(12) United States Patent
Asakura et al.

(10) Patent No.: US 7,651,033 B2
(45) Date of Patent: Jan. 26, 2010

(54) NONCONTRACT IC TAG WITH NON-CONDUCTIVE METAL FILM

(75) Inventors: Hiroyuki Asakura, Yokohama (JP); Kiyoshi Imaizumi, Tokyo (JP); Takeshi Iihara, Yokohama (JP); Kazuyuki Takasawa, Kashiwa (JP); Minoru Komada, Abiko (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 236 days.

(21) Appl. No.: 11/604,195

(22) Filed: Nov. 27, 2006

(65) Prior Publication Data
US 2007/0138303 A1 Jun. 21, 2007

(30) Foreign Application Priority Data
Dec. 19, 2005 (JP) ............................. 2005-364235
Feb. 17, 2006 (JP) ............................. 2006-040544

(51) Int. Cl.
*G06K 19/06* (2006.01)
(52) U.S. Cl. ..................... 235/492; 340/572.8; 428/209
(58) Field of Classification Search ................. 235/492; 427/123–127
See application file for complete search history.

(56) References Cited

U.S. PATENT DOCUMENTS 4,486,464 A * 12/1984 Young .......................... 427/63
5,246,766 A * 9/1993 Fukao et al. ................. 428/209
7,315,248 B2 * 1/2008 Egbert ......................... 235/492
2006/0040182 A1 * 2/2006 Kawakami et al. ......... 429/218.1
2006/0057390 A1 * 3/2006 Kittle et al. ............... 428/411.1

FOREIGN PATENT DOCUMENTS

| JP | A 62-174189 | 7/1987 |
| JP | A 63-157858 | 6/1988 |
| JP | A 63-249688 | 10/1988 |
| JP | B2 2703370 | 10/1997 |

OTHER PUBLICATIONS

Chapter 1-Shinku-jochaku-ho (or Vacuum Deposition Processes) (I-93 to I-95) of "Hakumaku-Kogaku Handbook (or Thin Film Engineering Handbook)," edited by Thin Film Committee No. 131, Nihon Gakujutsu Shinko-kai, published by Ohm, Tokyo, Japan in 1972.
Chapter 2-Shinku-jochaku-ho (Vacuum Deposition Processes) (pp. 10-16, and 50-51) (by Sadafumi Yoshida) of "Hakumaku (or Thin Film)," compiled by Oyobutsurigaku-Sensho 3, published by Baifukan, Tokyo, Japan in Jun. 1990.

* cited by examiner

*Primary Examiner*—Seung H Lee
*Assistant Examiner*—Christle I Marshall
(74) *Attorney, Agent, or Firm*—Oliff & Berridge, PLC

(57) ABSTRACT

A noncontact IC tag 1 comprises a base film 11, a noncontact IC circuit 2, 3 formed on the base film 11, and a plastic film or paper serving as a surfacing sheet 4, having a non-conductive, lustrous metal film 6m formed by deposition, laminated to the base film 11 on the side of the noncontact IC tag circuit 2, 3. The surface roughness of the non-conductive, lustrous metal film 6m, determined by atomic force microscopy, is more than 10 nm and 100 nm or less as indicated by the center line average height Ra. In the case where the non-conductive, lustrous metal film 6m is formed on the outer surface of the surfacing sheet 4, a concealing layer 4a may further be formed on the inner surface of the surfacing sheet 4 in order to enhance concealing properties.

12 Claims, 4 Drawing Sheets

NONCONTRACT IC TAG WITH NON-CONDUCTIVE METAL FILM

BACKGROUND OF THE INVENTION

1. Field of the Invention

The present invention relates to a noncontact IC tag with a non-conductive metal film. More particularly, the present Invention relates to a noncontact IC tag that has a lustrous deposited metal film but is non-conductive, and that is excellent in communication performance. Although the noncontact IC tag with a non-conductive metal film according to the present invention can be used as an ordinary noncontact IC tag, it is particularly favorable for applications where metallic IC tags having decorative properties are desirable.

The technical field of the invention is the production and use of noncontact IC tags. The noncontact IC tags of the present invention are useful mainly in the fields of transportation, distribution, sales control, process control, delivery of commodities, and luggage handling. Specifically, they can be used as tags, labels, slips, tickets, and the like.

2. Background Art

Noncontact IC tags have come to be used widely as identification media in the fields of transportation, distribution, and the like, or for such purposes as quality control, stock control, etc. of commodities, because information can be recorded and stored in them and the stored information is exchangeable by communication with external devices without bringing them into contact with the devices.

In order to meet demand for a decorative noncontact IC tag with a beautiful metallic luster, if a metal material such as aluminum foil or a conventional metallized material is used as the substrate of a noncontact IC tag, the IC tag causes communication failure, so that it cannot be used practically.

A possible cause of the above-described communication failure is as follows: eddy current flows in the metal film owing to the AC magnetic field produced by electromagnetic waves which the noncontact IC tag uses for data transmission/reception; this eddy current produces magnetic flux that repels the magnetic flux for data transmission/reception; the magnetic flux for data transmission/reception is thus reduced, which makes data transmission/reception difficult.

Another possible cause of the above-described communication failure is as follows: an antenna or coil made from an electrically conductive material forms a condenser together with the metal film; the stray capacitance produced by the condenser alters the inductance of the antenna or coil, and the resonance frequency characteristic of the condenser.

Noncontact IC tags with deposited metal films have a metallic luster that can never be expressed by printing, and are sophisticated in design, and it is very easy to locate them even if they have been attached to articles. For this reason, it is expected that such noncontact IC tags will be increasingly adopted in various fields. Effective measures should now be taken to prevent noncontact IC tags with deposited metal films from causing troubles, due to the deposited metal films, in communication with reader/writers.

In the meantime, there have been known techniques using deposited metal films of islands-in-sea structure as described in the following Patent Documents 1 to 4. The islands-in-sea structure (also referred to as island structure or islands) is that minute, discrete metal deposits (small islands) constitute a metal film (sea), and the surface of such a metal film deposited has been known to be non-conductive. However, none of these Patent Documents proposes the use of deposited metal films of islands-in-sea structure for noncontact IC tags. Technical literatures describing the formation of films of islands-in-sea structure, etc. include the following non-Patent Documents 1 and 2.

Patent Document 1: Japanese Laid-Open Patent Publication No. 174189/1987.

Patent Document 2: Japanese Laid-Open Patent Publication No. 157858/1988.

Patent Document 3: Japanese Laid-Open Patent Publication No. 249688/1988.

Patent Document 4: Japanese Patent Publication No. 2703370.

Non-Patent Document 1: Chapter 1-Shinku-jochaku-ho (or Vacuum Deposition Processes) (I-93 to I-95) of "*Haku-maku-Kogaku Handbook* (or Thin Film Engineering Handbook)", edited by Thin Film Committee No. 131, Nlhon Gakujutsu Shinko-kai, published by Ohm, Tokyo, Japan in 1972.

Non-Patent Document 2: Chapter 1-Shinku-jochaku-ho (or Vacuum Deposition Processes) (pp. 10-16, and 50-51) (by Sadafumi YOSHIDA) of "*Hakumaku* (or Thin Film)" compiled in *Oyobutsurigaku-Sensho* 3 published by Baifu-kan, Tokyo, Japan in June 1990.

It is impossible to give a metallic luster to noncontact IC tags by any of the prior art techniques because if a metal is deposited on any constituent layer of a noncontact IC tag, the deposited metal film makes the IC tag poor in communicational performance. We thought that non-conductive deposited metal films of islands-in-sea structure could solve this problem in the prior art. We made earnest studies to prove our idea, and, as a result, achieved the present invention.

SUMMARY OF THE INVENTION

The present invention is a noncontact IC tag with a non-conductive metal film, comprising a base film, an IC tag circuit composed of an IC chip and an antenna pattern connected to the IC chip, formed on the base film, and a non-conductive deposited metal film present on at least one of the two sides of the base film.

The present invention is the noncontact IC tag with a non-conductive metal film, in which at least one of the two surfaces of the base film is covered with a plastic film or paper, the non-conductive deposited metal film being on the plastic film or paper.

The present invention is the noncontact IC tag with a non-conductive metal film, in which the non-conductive deposited metal film is on the base film on the side opposite to the IC tag circuit.

The present invention is the noncontact IC tag with a non-conductive metal film, in which a first plastic film or paper is laid on the base film on the side of the IC tag circuit, and a second plastic film or paper is further laid over the first plastic film or paper, the non-conductive deposited metal film being on the second plastic film or paper.

The present invention is the noncontact IC tag with a non-conductive metal film, in which an adhesive layer is formed on the base film on the side opposite to the IC tag circuit.

The present invention is the noncontact IC tag with a non-conductive metal film, in which the IC chip in the IC tag circuit comprises a noncontact communication part, a controller, and a memory.

The present invention is the noncontact IC tag with a non-conductive metal film, in which the non-conductive deposited metal film is a deposited film of a single metal such as tin (Sn), zinc (Zn), lead (Pb), or bismuth (Bi), of an alloy of two or more metals selected from the group consisting of the above metals, of a tin-aluminum (Sn—Al) alloy, or of a tin-silicon (Sn—Si) alloy.

The present invention is the noncontact IC tag with a non-conductive metal film, in which the non-conductive deposited metal film is a deposited film of a tin-aluminum (Sn—Al) alloy, the ratio of the number of tin atoms to that of aluminum atoms being in the range of 100:(1-50).

The present invention is the noncontact IC tag with a non-conductive metal film, in which the surface resistivity of the non-conductive deposited metal film is in the range of $10^{10}$ to $10^{25}$ Ω/☐.

The present invention is the noncontact IC tag with a non-conductive metal film, in which the surface roughness of the non-conductive deposited metal film, determined by atomic force microscopy, is more than 10 nm and 100 nm or less as indicated by the center line average height Ra.

The present invention is the noncontact IC tag with a non-conductive metal film, in which the non-conductive deposited metal film is of islands-in-sea structure, the size of the islands being in the range of 20 nm to 1 μm, the distance between the islands being in the range of 10 to 500 nm.

The present invention is the noncontact IC tag with a non-conductive metal film, in which the non-conductive deposited metal film is a non-conductive, lustrous metal film, the surface roughness of the non-conductive, lustrous metal film, determined by atomic force microscopy, being more than 10 nm and 100 nm or less as indicated by the center line average height Ra.

The present invention is the noncontact IC tag with a non-conductive metal film, in which the non-conductive deposited metal film is a non-conductive, lustrous metal film, the non-conductive, lustrous metal film being formed on at least one of the two surfaces of the base film, the IC tag circuit being non-observable from the outside of the non-conductive, lustrous metal film.

The present invention is the noncontact IC tag with a non-conductive metal film, in which the non-conductive deposited metal film is a non-conductive, lustrous metal film, and a plastic film or paper is laid on the base film on the side of the IC tag circuit, the non-conductive, lustrous metal film being on the outer surface of the plastic film or paper, a concealing layer being formed on the inner surface of the plastic film or paper, the IC tag circuit being non-observable from the outside of the non-conductive, lustrous metal film.

The present invention is the noncontact IC tag with a non-conductive metal film, in which the non-conductive deposited metal film is a non-conductive, lustrous metal film, the IC tag circuit being non-observable from the outside of the non-conductive, lustrous metal film.

Preferably, the surface roughness of the non-conductive deposited metal film, determined by atomic force microscopy, is more than 10 nm and 100 nm or less as indicated by the center line average height Ra. This is because a non-conductive deposited metal film having a surface roughness value of 10 nm or less is poor in adhesion to other layer formed on it, while a non-conductive deposited metal film having a surface roughness value of more than 100 nm has no metallic luster and makes the noncontact IC tag less attractive in design.

A non-conductive deposited film of a tin-aluminum (Sn—Al) or tin-silicon (Sn—Si) alloy is preferred because it appears highly metallic and is excellent in color. It is also preferable to make the surface resistivity of the non-conductive deposited metal film from $10^{10}$ to $10^{25}$ Ω/☐. This is because a non-conductive deposited metal film having a surface resistivity value of less than $10^{10}$ Ω/☐ can be a cause of communication failure, while a non-conductive deposited metal film having a surface resistivity value of more than $10^{25}$ Ω/☐ has no metallic luster and makes the noncontact IC tag less attractive in design.

In the case of a non-conductive deposited metal film of a tin-aluminum (Sn—Al) alloy, it is particularly preferable to make the ratio of the number of tin atoms to that of aluminum atoms 100:(1-50) in order to make the deposited metal film non-conductive and lustrous.

Furthermore, in the above-described first to fourth features of the present invention, the non-conductive, lustrous metal film is preferably of islands-in-sea structure, where the size of the islands and the distance between the islands are preferably in the range of 20 nm to 1 μm and in the range of 10 to 500 nm, respectively. This is because when the size of the islands is greater than 1 μm and the distance between the islands is less than 10 nm, the deposited metal film can be a cause of communication failure, while when the size of the Islands is smaller than 20 nm and the distance between the islands is greater than 500 nm, the deposited metal film has no metallic luster and cannot make the noncontact IC tag sophisticated in design.

The noncontact IC tag with a non-conductive metal film according to the present invention has a deposited metal film, so that it has a metallic luster and is aesthetic. Since the deposited metal film is non-conductive, the noncontact IC tag never causes communication failure and is excellent in communication performance.

In the noncontact IC tag with a non-conductive metal film according to the present invention, if the deposited metal film is present on the tag surface, it serves as both a concealing layer and a light-reflecting layer. When such a noncontact IC tag is attached to an article, the article becomes more attractive in design, and, in addition, the position of the IC tag on the article can be known clearly.

Since the deposited metal film is usually thin, the amount of a metal needed to form it is smaller than the amount of aluminum needed to form aluminum foil. Moreover, the deposited metal film can give a metallic luster to the noncontact IC tag and make the tag attractive in design, just like aluminum foil can do.

In the noncontact IC tag with a non-conductive metal film, the non-conductive deposited metal film has surface roughness in a proper range, so that it is moderate in luster. Moreover, since the deposited metal film has no mirror surface, it is excellent in processability.

The IC tag circuit in the noncontact IC tag with a non-conductive metal film is non-observable from the outside of the IC tag, so that no users feel uneasy.

The noncontact IC tag with a non-conductive metal film has a concealing layer on its inside, and this concealing layer entirely conceals the IC tag circuit to make the noncontact IC tag more attractive in design. Since the IC tag circuit is thus concealed, no users feel uneasy.

The noncontact IC tag with a non-conductive metal film is that in which a plastic film or paper with a deposited metal film is further laminated to a completed noncontact IC tag. The IC tag circuit in the ready-made noncontact IC tag is thus entirely concealed, so that no users feel uneasy.

DETAILED DESCRIPTION OF THE INVENTION

A noncontact IC tag with a non-conductive metal film according to the present invention will be described hereinafter with reference to the accompanying drawings.

Figure 1:
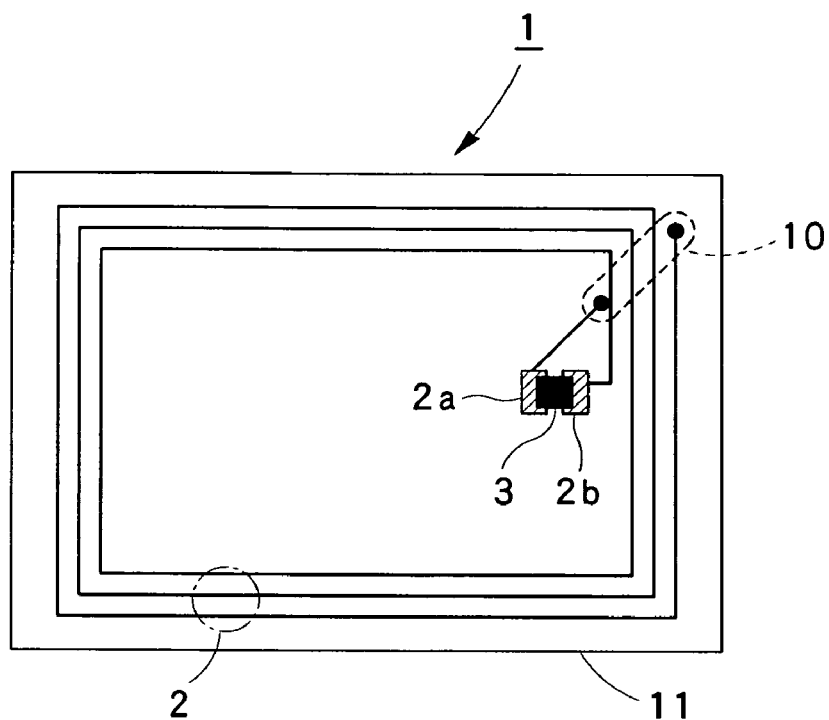
FIG. 1 is a plan view showing a first embodiment of a noncontact IC tag with a non-conductive, lustrous metal film according to the present invention.
Figure 2:
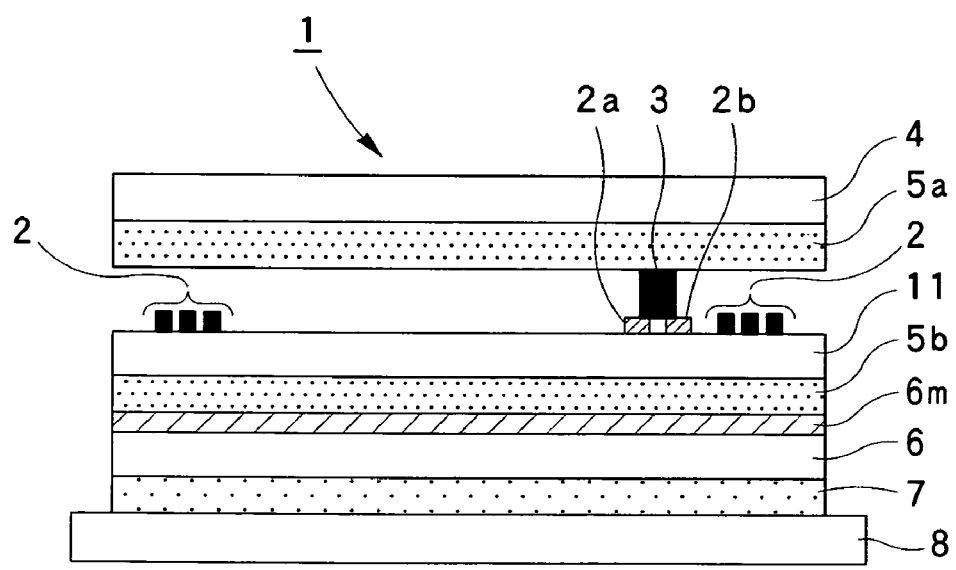
FIG. 2 is a sectional view of the noncontact IC tag shown in FIG. 1.
Figure 3:
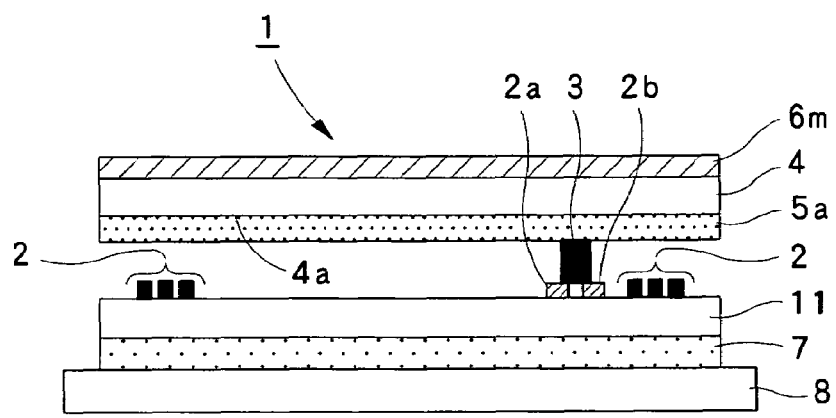
FIG. 3 is a sectional view showing a second embodiment of a noncontact IC tag with a non-conductive, lustrous metal film according to the present invention.
Figure 4:
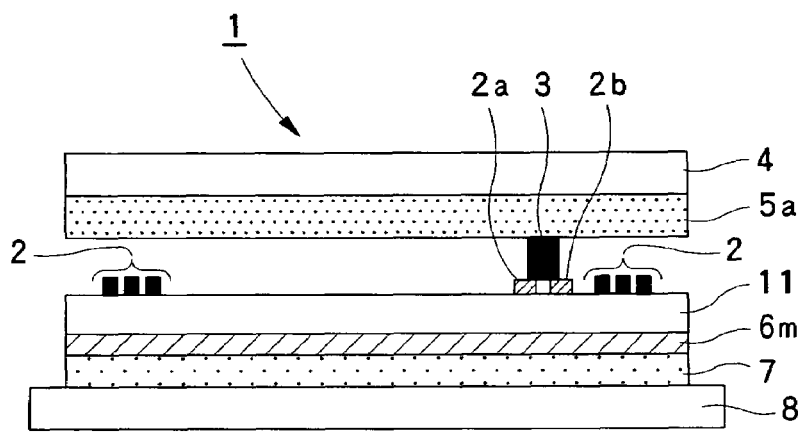
FIG. 4 is a sectional view showing a third embodiment of a noncontact IC tag with a non-conductive, lustrous metal film according to the present invention.
Figure 5:
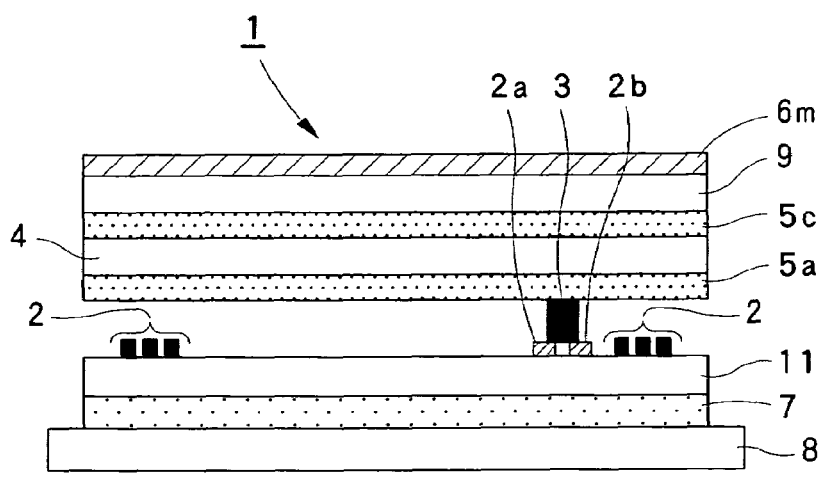
FIG. 5 is a sectional view showing a fourth embodiment of a noncontact IC tag with a non-conductive, lustrous metal film according to the present invention.
Figure 6:
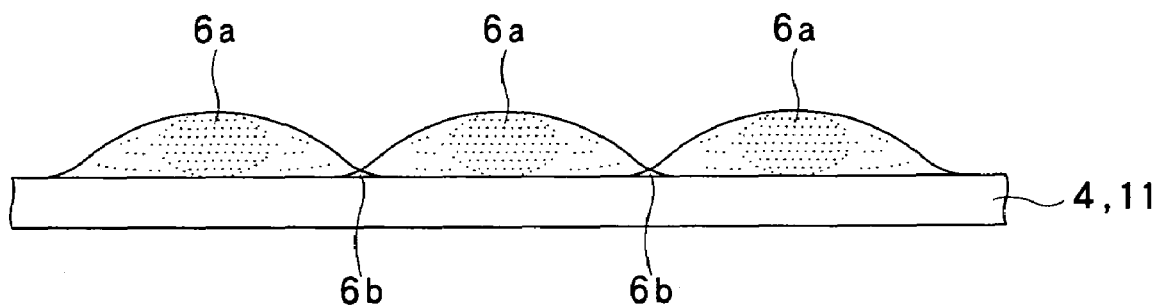
FIG. 6 is a diagrammatic sectional view illustrating the structure of a non-conductive deposited metal film.
Figure 7:
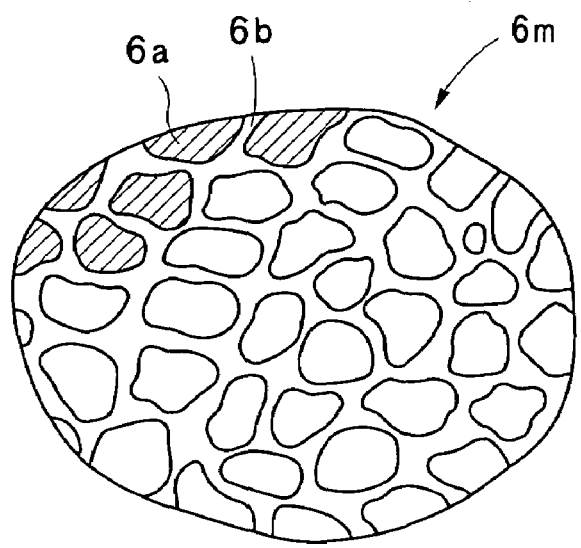
FIG. 7 is a diagrammatic plan view of a non-conductive deposited metal film.
Figure 8:
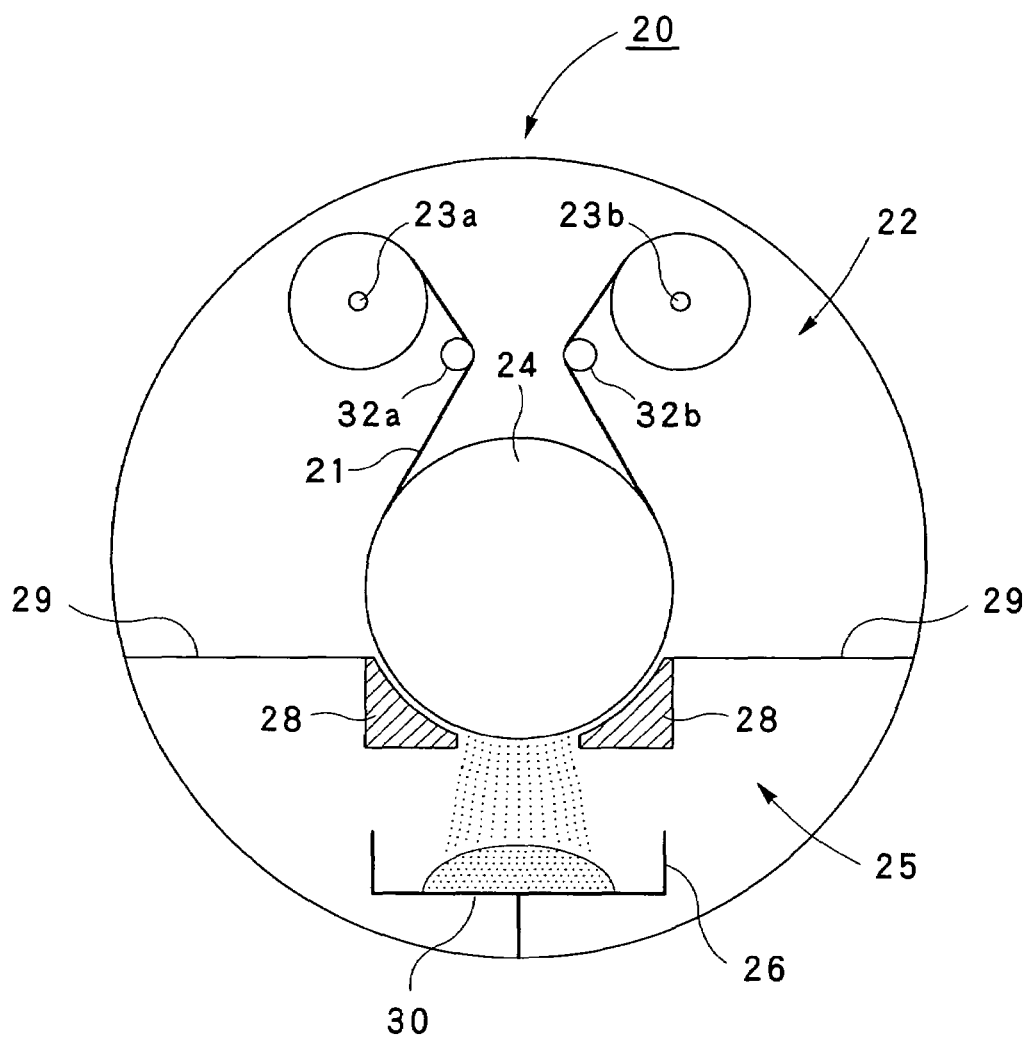
FIG. 8 is a conceptual view showing the structure of a vacuum deposition apparatus of winding-up type.
Figure 8:
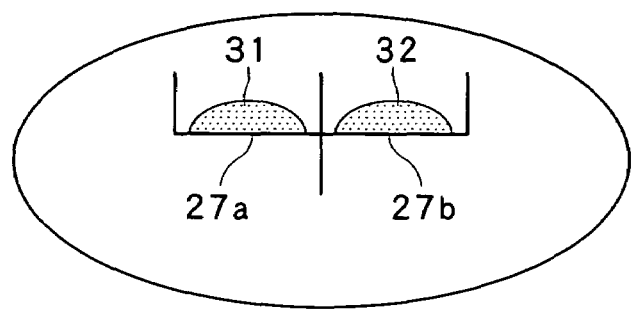

FIG. 1 is a plan view showing a first embodiment of a noncontact IC tag with a non-conductive metal film according to the present invention, FIG. 2 is a sectional view of the noncontact IC tag shown in FIG. 1, FIG. 3 is a sectional view showing a second embodiment of a noncontact IC tag with a non-conductive metal film, FIG. 4 is a sectional view showing a third embodiment of a noncontact IC tag with a non-conductive metal film, FIG. 5 is a sectional view showing a fourth embodiment of a noncontact IC tag with a non-conductive metal film, FIG. 6 is a diagrammatic sectional view illustrating the structure of a non-conductive deposited metal film, FIG. 7 is a diagrammatic plan view of a non-conductive deposited metal film, and FIG. 8 is a conceptual view showing the structure of a vacuum deposition apparatus of winding-up type.

FIG. 1 is a plan view showing a first embodiment of a noncontact IC tag with a non-conductive metal film.

As shown in FIG. 1, the noncontact IC tag with a non-conductive metal film 1 according to the present invention comprises a base film 11, and an IC tag circuit 2, 3 composed of an IC chip 3 and an antenna pattern 2 connected to the IC chip 3, formed on the base film 11.

Namely, a conductive antenna pattern 2 is formed on the base film 11, and an IC chip 3 is connected to both ends 2a, 2b of the antenna pattern 2. Although the antenna pattern 2 shown in FIG. 1 is in the shape of a magnetic induction coil, It may be in any shape and may be a patch or dipole antenna.

In FIG. 1, the member designated by reference numeral 10 is a guide member that guides one end of the coil to the end 2a of the antenna pattern 2 via the back surface of the base film 11. Like a conventional IC chip, the IC chip 3 comprises a noncontact communication part, a controller, and a memory for storing information. These parts, together with a capacitative element, such as a stray capacitative element, of the circuit, constitute a noncontact IC tag circuit that gives a certain resonance frequency.

FIG. 2 is a sectional view of the noncontact IC tag with a non-conductive metal film (hereinafter sometimes simply referred to as a "noncontact IC tag") 1 shown in FIG. 1, taken along a line intersecting the IC chip 3 portion. In the noncontact IC tag shown in FIG. 2, a surfacing sheet 4 made of a transparent plastic film is laminated, usually with an adhesive layer 5a, to the transparent base film 11 on the side of the antenna pattern 2 so that the antenna pattern 2 and the IC chip 3 are not exposed. In this figure, the antenna pattern 2 and the adhesive layer 5a are depicted with a space between the antenna pattern 2 and the adhesive layer 5a, but they are actually in close contact with each other. The above-described structure of the noncontact IC tag of the invention is the same as that of a conventional noncontact IC tag.

In the noncontact IC tag 1 shown in FIGS. 1 and 2, a backing sheet 6 with a lustrous metal film 6m is laminated, with an adhesive layer 5b, to the back surface of the base film 11, that is, the base film 11 on the side opposite to the antenna pattern 2 or IC chip 3. The lustrous metal film 6m is non-conductive. The back surface of the backing sheet 6 is covered with. a pressure-sensitive adhesive layer 7, with which the noncontact IC tag is attached to an object. This pressure-sensitive adhesive layer 7 is protected by release paper 8.

When this noncontact IC tag 1 is observed from the front side, the non-conductive, lustrous metal film 6m can be seen through the base film 11 as the background of the antenna pattern 2. It is thus necessary that the base film 11 be transparent. Paper is also usually used as the surfacing sheet 4. It is, however, necessary to use a transparent plastic film as the surfacing sheet 4, in order to make the non-conductive, lustrous metal film 6m visible from the front side of the IC tag 1. The same applies to the adhesive layers 5a, 5b. On the other hand, in the case where the noncontact IC tag 1 shown in FIG. 2 is attached to a transparent glass plate or the like with the pressure-sensitive adhesive layer 7 after removing the release paper 8, if the backing sheet 6 and the pressure-sensitive adhesive layer 7 are transparent as well, the non-conductive, lustrous metal film 6m can be seen through the two layers and the transparent glass plate when viewed from the adherend side.

FIG. 3 is a sectional view showing a second embodiment of a noncontact IC tag with a non-conductive metal film according to the present invention. In the noncontact IC tag shown in this figure, a surfacing sheet 4 with a lustrous metal film 6m is laminated, with an adhesive layer 5a, to the surface of the base film 11 surface on which the antenna pattern 2 has been formed. The lustrous metal film 6m is non-conductive.

In the embodiment shown in FIG. 3, the non-conductive, lustrous metal film 6m is present on top of the surfacing sheet 4 as the outermost layer of the IC tag 1. Alternatively, the metal film 6m may be present on the surfacing sheet 4 on the side of the antenna pattern. Although the surfacing sheet 4 may be opaque paper in the former case, it should be a transparent plastic film in the latter case in order that the non-conductive, lustrous metal film 6m can be seen from the front side of the IC tag 1. The back surface of the base film 11 is covered with a pressure-sensitive adhesive layer 7 with which the noncontact IC tag 1 is attached to an object. The pressure-sensitive adhesive layer 7 is protected by release paper 8.

Although a plan view of the noncontact IC tag shown in FIG. 3 is omitted herein, the non-conductive, lustrous metal film 6m can be seen but the noncontact IC tag circuit 2, 3 situated behind the metal film 6m is non-observable from the front side of the IC tag. The perspective view of the IC tag circuit 2,3 itself is the same as that of the IC tag circuit shown in FIG. 1.

In general, most users of IC tags feel uneasy when the noncontact IC tag circuits 2, 3 in the IC tags are observable from the outside of the IC tags.

In order to solve this problem, the IC tag circuit is made non-observable from the outside of the IC tag 1 in the present invention. If the non-conductive, lustrous metal film 6m formed on the outer surface of the surfacing sheet 4 is not sufficient to conceal the IC tag circuit 2, 3, a concealing layer 4a may further be formed on the other surface (bearing no luminous metal film 6m) of the surfacing sheet 4 by conducting concealing printing such as white solid printing, or by laminating a colored paper or the like. That the IC tag circuit 2, 3 is non-observable from the outside of the IC tag 1 herein means that the shape, etc. of the IC tag circuit 2, 3 are not recognizable with the naked eyes from the outside of the IC tag 1.

In FIG. 3, only the non-conductive, lustrous metal film 6m is depicted as the outermost layer of the IC tag 1. It is, however, a matter of course that a decorative pattern may further be printed on this metal film 6m. An IC tag 1 with such a decorative pattern can give a more artistic impression.

FIG. 4 is a sectional view showing a third embodiment of a noncontact IC tag with a non-conductive, lustrous metal film according to the present invention.

In the noncontact IC tag shown in this figure, a lustrous metal film 6m is formed directly on a transparent base film 11 on the side opposite to an antenna pattern 2. This lustrous metal film 6m is non-conductive. Unlike the IC tag shown in FIG. 2, the IC tag of this embodiment requires no backing sheet 6, which leads to cost reduction. A transparent plastic film is used for the surfacing sheet 4 in this IC tag. A pressure-sensitive adhesive layer 7, with which the noncontact IC tag 1 will be attached to an article, is formed on the back surface of the non-conductive, lustrous metal film 6m formed on the transparent base film 11. The pressure-sensitive adhesive layer 7 is protected by release paper 8. The plan view of this IC tag is the same as that of the noncontact IC tag shown in FIG. 1.

FIG. 5 is a sectional view showing a fourth embodiment of a noncontact IC tag with a non-conductive, lustrous metal film according to the present invention.

In the IC tag shown in this figure, a first surfacing sheet 4 is laminated, with an adhesive layer 5a, to a base film 11 on the side of an IC tag circuit 2, 3, and a second surfacing sheet 9 is laminated, with an adhesive layer 5c, to the surface of the first surfacing sheet 4. A non-conductive, lustrous metal film 6m is formed on the second surfacing sheet 9.

In FIG. 5, the non-conductive, lustrous metal film 6m is present on the second surfacing sheet 9 as the outermost layer of the IC tag 1. However, if the second surfacing sheet 9 is transparent, the lustrous metal film 6m may be formed on the other surface of the second surfacing sheet 9, faced to the first surfacing sheet 4.

The IC tag of the fourth embodiment can be obtained by laminating the second surfacing sheet 9 with the non-conductive, lustrous metal film 6m to a conventional, ready-made noncontact IC tag 1. The plan view of this IC tag is the same as that of the IC tag of the second embodiment shown in FIG. 3.

FIG. 6 is a diagrammatical sectional view illustrating the structure of a non-conductive deposited metal film, and FIG. 7 is a diagrammatical plan view of a non-conductive deposited metal film. In the present invention, a non-conductive deposited metal film whose surface roughness is in a prescribed range as will be described later and which is lustrous is referred to as a non-conductive, lustrous metal film.

The non-conductive deposited metal film is usually a deposited metal film of islands-in-sea structure. Islands-in-sea structure has been known in conventional arts and can be obtained by making a proper selection of a material to be deposited, deposition conditions, and so forth. The non-conductive deposited metal film is composed of minute islands 6a and spaces 6b between the islands 6a. A deposited metal film of such islands-in-sea structure can be obtained by depositing a metal directly on a plastic or paper substrate. Alternatively, a metal is first deposited on a transfer film, and this deposited metal film is transferred to the desired substrate. In both cases, the size and shape of the islands are in certain ranges, but are not precisely uniform. Since the non-conductive, lustrous metal film 6m is formed by deposition, it is also referred to as a non-conductive deposited metal film.

Preferably, the size (mean diameter) of the islands 6a is in the range of 20 nm to 1 μm, and the distance (mean distance) 6b between the islands 6a, in the range of 10 to 500 nm. A lustrous metal film 6m having islands 6a in a size of less than 20 nm has no metallic luster, so that it cannot have satisfactorily good decorative properties. On the other hand, a lustrous metal film 6m having islands 6a in a size of more than 1 μm is electrically conductive and can thus be a cause of communication failure.

There is a case where the eyes or even a microscope cannot distinguish some spaces between the islands clearly from the islands. This is a case where, as shown in the plan view in FIG. 7, the islands 6a are thick metal deposits with high metal density, and the metal is present also in the spaces 6b between the islands 6a although the metal density is low. The portions between the islands, having low metal density, are grain boundaries and have high electrical resistivity.

Moreover, the islands 6a themselves are not uniform in metal density and are thus non-uniform in electrical resistivity, and some islands are electrically non-conductive. Therefore, when the spaces between the islands cannot be distinguished clearly from the islands, it is proper to understand that the spaces 6b between the islands 6a are low-metal-density portions (grain boundaries).

The formation of a metal film of islands-in-sea structure is governed by intricately tangled factors such as the generation and growth of the nuclei of metal atom deposits, and coalescence of islands. It is possible to predetermine, as desired, the size of the islands and the mean distance between the islands by making a proper selection of a metal to be deposited and of deposition conditions such as the rate of deposition. However, to form a film of islands-in-sea structure as desired, considerably complicated control is required, and only limited materials can be used.

In general, it is relatively easy to control the size of the islands and the mean distance between the islands, if metals or rare metals having low melting points are used. Examples of such metals include single metals such as tin (Sn), zinc (Zn), lead (Pb), and bismuth (Bi), alloys of two or more metals selected from the group consisting of the above metals, tin-aluminum (Sn—Al) alloys, and tin-silicon (Sn—Si) alloys. Of these, tin (Sn) is most preferred when the easiness of control of the size of the islands and the mean distance between the islands is taken into consideration. Vapor deposition of tin-aluminum is conducted in the following manner: tin and aluminum are placed in separate crucibles and are evaporated to deposit on a substrate to form a tin-aluminum alloy film. Vapor deposition of tin-silicon can be performed in the same manner.

Although aluminum is excellent in metallic luster, aluminum itself has high surface energy, and aluminum deposited on a substrate is liable to migrate on the substrate. Aluminum is thus a metal material that does not easily form islands when deposited on a substrate.

Preferably, the surface resistivity of the non-conductive, lustrous metal film is in the range of $10^{10}$ to $10^{25}$ Ω/□. A lustrous metal film with a surface resistivity value of less than $10^{10}$ Ω/□ is nearly electrically conductive, which can be a cause of communication failure. On the other hand, a lustrous metal film with a surface resistivity value of more than $10^{25}$ Ω/□ has no metallic luster and thus has no satisfactorily good decorative properties.

In the case of direct deposition, the surface resistivity of the metal film is controlled by film thickness, which varies with the rate or time of deposition.

Preferably, the surface roughness of the non-conductive, lustrous metal film is in a prescribed range. Specifically, it is desirable that the surface roughness of the non-conductive, lustrous metal film, determined by atomic force microscopy, be in the range of 10 to 100 nm, preferably in the range of 10 to 70 nm, as indicated by the center line average height Ra. This is for making the irregularities on the surface of the non-conductive, lustrous metal film 6m uniform. A lustrous metal film having a surface roughness value of more than 100 nm has no metallic luster and is thus less decorative, while a lustrous metal film having a surface roughness value of less than 10 nm has a mirror surface and cannot have good adhesion to a layer formed on it.

In the present invention, to clarify the profile of a non-conductive, lustrous metal film surface, the surface roughness Ra of the lustrous metal film is determined by the use of an atomic force microscope (hereinafter referred to as an "AFM"). An AFM manufactured by Digital Instruments Corporation, Seiko Instruments Inc., Japan, or Topometrix Corporation can be used herein. For example, in the case where an AFM "Nano Scope III" manufactured by Digital Instruments Corporation is used, the AFM image obtained by scanning, with the tapping mode, a roughened surface in a size of 500 nm×500 nm is subjected to flattening processing, and the processed data is subjected to a roughness analysis in order to determine the surface roughness Ra (average center line height) of the sample. The size (mean diameter) of the islands and the distance (mean distance) between the islands can also be measured in the same manner. For the measurement, a cantilever, neither abraded nor stained, is used, and a portion with relatively uniform irregularities, without significant depressions or protrusions, is used as a sample.

The tapping mode is as described in Q. Zong, et al., *Surface Science Letter*, 290, L688-692 (1993). It is a mode of determining the three-dimensional configuration of a film surface, in which a sample surface is lightly touched discontinuously with a probe attached to the tip of a cantilever vibrated by a piezoelectric vibration generator at a frequency near the resonance frequency (approximately 50 to 500 MHz). In this mode, the cantilever is moved along the depth of irregularities (the Z direction) so that the change in vibration amplitude detected is kept constant, and the signals obtained by the movement of the cantilever in the Z direction and in the planar direction (the X-Y direction) are used in combination to determine the three-dimensional configuration of the sample surface. The flattening processing is that the two-dimensional data is corrected in terms of slanting relative to the reference plane in a one-, two-, or three-dimensional function. The data thus processed are subjected to a roughness analysis, and the surface roughness Ra is calculated by using the following equation 1.

$$Ra = \frac{1}{LxLy} \int_0^{Ly} \int_0^{Lx} |f(x,y)| dx dy \quad (1)$$

where Lx and Ly are the surface size in the X direction and that in the Y direction, respectively, and f(x, y) is the average roughness curved plane relative to the center plane. The center plane corresponds to the centerline of a roughness curve in ordinary surface roughness measurement, and it is an average plane obtained so that the portions above and below this plane are equal in volume.

The reason why the method specified in JIS B-0601 or its corresponding international standard ISO 468, for example, is not used for the surface roughness measurement in this application is as follows: the non-conductive deposited metal films formed in the present invention have surfaces with extremely fine irregularities, and it has been clear that such fine irregularities are indeterminable by a conventional method of measurement.

Next, a method for producing a noncontact IC tag with a non-conductive, lustrous metal film according to the present invention will be described hereinafter. A process for producing a substrate with a deposited metal film and a process for producing a noncontact IC tag will be described separately.

[Process for Producing Substrate with Deposited Metal Film]

Plastic films or paper is used for the surfacing sheet 4, the second surfacing sheet 9, and the backing sheet 6. The base film 11 is required to have insulating properties, and a plastic film is favorably used for it. Although it is easy to deposit a metal on a plastic film, deposition of a metal on a paper substrate is usually not easy for the following reasons.

(1) Since paper contains water unlike plastic films, a high vacuum cannot be attained while depositing a metal on a paper substrate. To solve this problem, it is necessary to treat paper before subjecting it to vacuum deposition, if the paper is not specialty paper with low water content, such as condenser paper.

(2) in the case where ordinary paper is used as a substrate, it is necessary to dry it before depositing a metal on it. The drying step takes many hours, so that it causes a large increase in production cost. In addition, since paper loses its original characteristics when dried, it is necessary to control the water content of the paper after a metal has been deposited on it.

(3) Since paper has a roughened surface, metal particles deposited on paper easily enter into it. It is therefore necessary to apply an undercoat to paper before depositing a metal on it.

However, metals are now often deposited directly on paper materials thanks to the recent progress in vacuum deposition apparatus and process, and also to the improvements in paper materials. The following method is also employed presently to deposit a metal on a paper substrate: a metal is first deposited on a plastic film, and in another vacuum deposition chamber, the deposited film is in-line transferred to a paper substrate coated with an adhesive.

In the case where a metal is deposited directly on a paper substrate, the following steps are effected: pretreatment of a substrate→drying→vacuum deposition→posttreatment→moistening→processing into a metallized product→printing→cutting. The pretreatment of a substrate means application of an undercoat to a substrate.

It is preferable to form beforehand the desired surface treatment layers also on plastic films of various types so that improved adhesion can be obtained between the plastic films and metal films deposited thereon. To form the surface treatment layers, there may be conducted corona discharge treatment, ozone treatment, low-temperature plasma treatment using such a gas as oxygen or nitrogen, glow discharge treatment, or oxidization treatment using chemicals. The surface pretreatment may be conducted in a separate step. Alternatively, such surface pretreatment as low-temperature plasma treatment or glow discharge treatment may be carried out as in-line treatment prior to vacuum deposition.

To obtain improved adhesion between a plastic film and a metal film deposited thereon, a surface treatment layer such as a primer film, an undercoat film, an anchoring agent film, or an adhesive layer may also be formed, as desired, on the surface of a plastic film before subjecting the plastic film to vacuum deposition.

For the above-described pretreatment, as a coating compound, a resin composition containing, as a main vehicle, a resin selected from polyester resins, polyamide resins, polyurethane resins, epoxy resins, phenolic resins, (meth)acrylic resins, polyvinyl acetate resins, polyolefin resins such as polyethylene and polypropylene, polyolefin copolymer resins, modified polyolefin resins, cellulose resins, and the like can be used.

To the above resin composition, additives such as epoxy silane coupling agents for improving adhesion, and anti-blocking agents for preventing blocking of substrate films may be added, if necessary. The amount of such additives to be added is preferably about 0.1 to 10% by weight of the resin composition.

To form a coating film on a plastic film, a coating compound of solvent, aqueous, or emulsion type is applied to a plastic film by such a coating method as roll, gravure, or kiss-roll coating.

The thickness of the non-conductive, lustrous metal film 6m is approximately 10 to 50 nm. A lustrous metal film 6m with a thickness of 50 nm or more is usually electrically conductive. Since the lustrous metal film 6m is not a film with high metal density, it is advantageous in that the amount of a metal needed to form it is only 1/1000 to 1/100 of the amount of aluminum needed to form aluminum foil with a thickness of 7 μm.

Deposition processes useful herein are conventional ones including physical vapor deposition processes (PVD processes) such as vacuum vapor deposition, sputtering, and ion plating; chemical vapor deposition processes (CVD processes) such as thermochemical vapor deposition and photochemical vapor deposition; and atmospheric-pressure plasma vapor deposition.

To form a metal film on a substrate film by vacuum vapor deposition, a metal material, a source, is vaporized by heating in a vacuum chamber and is deposited on a substrate film. To deposit a metal film on a substrate film by sputtering, a known sputtering process, such as high frequency or magnetron sputtering, may be employed. Deposition of a metal film on a substrate film by high frequency sputtering may be performed in the following manner: a metal material is put on an electrode surface as a target; an inert gas such as argon gas is introduced into a chamber to maintain the internal pressure of the chamber at about 0.1 to 5 Pa; an electric voltage of several hundred volts is applied to the above electrode at a frequency of as high as 13.56 MHz, for example, to cause a discharge in the chamber to sputter the target, whereby a metal film is deposited on the substrate film. To deposit a metal film on a substrate film by magnetron sputtering, permanent magnet or electromagnet is, in the above-described sputtering process, attached to the electrode on which the target is placed. Since the magnetic field produced by the permanent magnet or electromagnet increases the density of discharged electrons and thus improves sputtering efficiency, a metal film is deposited on a plastic film with high sputtering efficiency.

Deposition of a metal film on a substrate film by ion plating is performed in the following manner: a metal material, a source, is evaporated in a vacuum chamber for ionization, and a substrate film is bombard with the metal ions, thereby forming a metal film on the substrate film. Deposition of a metal film on a substrate film by PVD can be conducted in the similar way: a target (a metal plate or the like) is bombard with highly energized atoms in a high vacuum, and the metal atoms of the target are thus blown away to deposit on a plastic film.

Conventional vacuum deposition processes will be described hereinafter in more detail.

FIG. 8 is a conceptual view showing the structure of a vacuum deposition apparatus of winding-up type in this figure, a vacuum deposition apparatus 20 comprises a vacuum chamber 22, a feed roll 23a placed in the vacuum chamber 22, a wind-up roll 23b, a coating drum 24, a vacuum deposition chamber 25 separated from the vacuum chamber 22 by partitions 29, 29, a crucible 26 placed in the vacuum deposition chamber 25, a source 30, and masks 28, 28. In the vacuum chamber 22 of this vacuum deposition apparatus 20, a substrate film 21 fed from the feed roll 23a via a guide roll 32a runs around the periphery of the coating drum 24 and is wound around the wind-up roll 23b. In the vacuum deposition chamber 25, the source 30 in the heated crucible 26 scatters metal atoms. The metal atoms, evaporated and scattered, deposit on the substrate film 21, which is in contact with the cooled coating drum 24, at the zone between the masks 28, 28, thereby forming a non-conductive, lustrous metal film 6m. Since the coating drum 24 is cooled, the metal vapor is rapidly cooled to form a film. The substrate film 21 with the non-conductive, lustrous metal film 6m is wound around the wind-up roll 23b via a guide roll 32b.

The partitions 29, 29 constitute barriers for separating, from the vacuum deposition chamber 25, the vacuum chamber 22 whose inner pressure readily increases due to feeding of the substrate film 21 from the feed roll 23a. In order to maintain the high vacuum on the inside of the vacuum deposition chamber 25 in which the source 30 is placed, it is necessary to arrange the partitions 29, 29, the masks 28, 28, and the coating drum 24 as close as possible. The diameter of the crucible 26 is nearly equal to the width of the substrate film 21 that will pass over the crucible 26, so that the metal atoms deposit uniformly on the entire surface of the substrate film 21 to form a metal film with a uniform thickness.

The source 30 placed in the crucible 26 is evaporated by high-frequency induction, resistance, or electron beam (EB) heating, and the vapor is deposited on the substrate film 21. In the case of vapor deposition of a single metal, the metal is placed in the crucible 26 as the source 30. A single metal such as tin (Sn), zinc (Zn), lead (Pb), or bismuth (Bi), deposited by the above-described vapor deposition process, forms a film of islands-in-sea structure.

To form an alloy of two or more metals on the substrate film 21, two crucibles 27a, 27b placed side by side as shown in the oval at the bottom of FIG. 8 are used. In this case, the two crucibles 27a, 27b are filled with two different metal materials 31, 32, respectively, and multi-source vacuum deposition is performed.

Generally, it is preferable to employ different conditions to heat the different metal materials 31, 32. This is because when different metals contained in one crucible or different crucibles are heated under the same condition, one of the metals is evaporated earlier than the other, so that the metals cannot form an alloy film with the desired ratio of the number of atoms of one metal to that of the other.

The atoms of the two metals evaporated from the sources in the crucibles 27a, 27b form an alloy of the two metals on the substrate film 21. A film of a tin-lead (Sn—Pb), tin-aluminum (Sn—Al), or tin-silicon (Sn—Si) alloy can be formed by the above-described method of vapor deposition.

In the case of a deposited film of a tin-aluminum (Sn—Al) alloy, such a metal composition that the number of aluminum (Al) atoms is about 1 to 50 for 100 tin (Sn) atoms is desirable for the film. This is because a tin-aluminum alloy in which the number of aluminum atoms is more than 50 for 100 tin atoms cannot easily form a non-conductive film of islands-in-sea structure, while a tin-aluminum alloy in which the number of aluminum atoms is less than 1 for 100 tin atoms cannot form a film having a metallic luster characteristic of aluminum. The ratio of the number of atoms of a metal in a deposited film to that of another metal in the film can be determined by the use of an X-ray electron spectroscopy chemical analyzer (ESCA).

When the degree of vacuum on the inside of the vacuum deposition chamber 25 is made higher, there can be obtained a deposited film having higher metal density and lower resistance. Generally, the vacuum deposition chamber 25 should be drawn to a vacuum of $10^{-2}$ Pa or less. However, this vacuum level is not always needed to form a non-conductive metal film of islands-in-sea structure. The thickness of the deposited film can be controlled by regulation of the running speed of the substrate film 21, the source-heating conditions, the distance between the masks 28, 28, and so forth.

In order to protect the deposited film, a hard coat layer may be formed on the surface of the non-conductive, lustrous metal film 6*m*. Further, a white-colored concealing layer or a colored layer may also be formed, by printing using ink, on the back surface of the substrate film 21, that is, the surface of the substrate film 21 on the side opposite to the non-conductive, lustrous metal film 6*m*, in order to enhance concealing properties. Alternatively, a paper substrate or a white film may be laminated, as a concealing layer, to the back surface of the substrate film 21.

[Process for Producing Noncontact IC Tag]

An antenna pattern 2 is first formed on a transparent base film 11 by such a method as photo-etching or printing. In the case where the antenna pattern 2 is formed by photo-etching, a laminate of the base film 11 and aluminum or copper foil is used. A coil of several turns, with a line width of about 0.2 to 1.0 mm, is usually formed as the antenna pattern 2. Thereafter, an IC chip 3 is connected to both ends 2*a*, 2*b* of the antenna pattern 2. An anisotropically conductive adhesive or the like is used for this purpose.

A surfacing sheet 4 made of a plastic film or paper is laminated to the base film 11 on the side of the antenna pattern 2 and the IC chip 3.

The noncontact IC tag of the present invention is characterized by comprising a non-conductive, lustrous metal film, and this metal film 6*m* may be formed on any substrate. For example, in the embodiment shown in FIG. 2, a backing sheet 6 with a non-conductive, lustrous metal film 6*m* is laminated, with an adhesive layer 5*b*, to the back surface of a base film 11, and release paper 8 is finally laminated, with a pressure-sensitive adhesive layer 7, to the backing sheet 6 surface on the adherend side. In the embodiment shown in FIG. 3, a surfacing sheet 4 with a non-conductive, lustrous metal film 6*m* is laminated to a base film 11 on the side of an antenna pattern 2. In this case, release paper 8 with a pressure-sensitive adhesive layer 7 is laminated directly to the back surface of the base film 11.

In the embodiment shown in FIG. 5, a second surfacing sheet 9 with a non-conductive, lustrous metal film 6*m* is laminated, with an adhesive layer 5*c*, to the surfacing sheet 4 face of a noncontact IC tag produced in a conventional manner. A non-conductive, lustrous metal film 6*m* may also be formed on the back surface of a base film 11 as in the embodiment shown in FIG. 4.

<Other Materials>

(1) Base Film

A variety of plastic films can be used for the base film. One of the following films, or a composite film of two or more of the following films, may be used as the base film: films of polyethylene terephthalate (PET), PET-G (terephthallc acid—cyclohexane dimethanol—ethylene glycol copolymers), polyvinyl chloride, vinyl chloride—vinyl acetate copolymers, polycarbonate, polyamide, polyimide, cellulose diacetate, cellulose trlacetate, polystyrenes, ABS, polyacrylic esters, polypropylene, polyethylene, polyurethane, and so forth. It is desirable that the thickness of the base film be approximately 12 to 300 μm, more preferably about 20 to 200 μm.

(2) Surfacing Sheet

The above-enumerated materials for the base film can be used as the surfacing sheet. It is desirable that the thickness of the surfacing sheet be approximately 8 to 300 μm, more preferably about 10 to 200 μm.

(3) Substrate with Deposited Metal Film

A substrate on which a non-conductive, lustrous metal film is deposited can be selected from a variety of plastic films and paper. Examples of plastic films include the above-enumerated plastic films useful for the base film and for the surfacing sheet. Examples of paper useful herein include woodfree paper, coated paper, craft paper, glassine paper, synthetic paper, and latex- or melamine-impregnated paper.

(4) Adhesive, Pressure-Sensitive Adhesive

The word "adhesive" used herein encompasses adhesives of various types, such as solvent type adhesives, polymerization type adhesives, ultraviolet-curing adhesives, emulsion adhesives, and hot-melt adhesives, and so-called pressure-sensitive adhesives are also included in this word. This is because adhesives of any type meet the purpose of laminating two members.

The word "pressure-sensitive adhesive" as used herein means an adhesive whose viscosity does not significantly increase with time and whose mild tackiness remains almost permanently.

Examples of resin materials herein useful for the adhesive or pressure-sensitive adhesive include natural rubber, nitrile rubber, epoxy resins, vinyl acetate emulsions, acrylic resins, acrylic ester copolymers, polyvinyl alcohols, and phenolic resins.

EXAMPLES

The present invention will now be described more specifically by referring to the following Examples. However, the Examples are not intended to limit or restrict the scope of the invention in any way. Like reference numerals designate like parts throughout the following examples and the accompanying drawings.

Example 1

(Preparation of Substrate with Deposited Metal Film)

A 20-μm thick, biaxially oriented PET film whose surface had been subjected to corona discharge treatment was used as the backing sheet 6. This biaxially oriented PET film was set on a feed roll in a PVD apparatus 20. While feeding the PET film, tin (Sn) was deposited, under the following conditions, on the PET film surface pretreated by corona discharge to form a 20-nm thick film 6m of islands-in-sea structure. In order to evacuate the vacuum deposition chamber 25 to the desired degree of vacuum, argon (Ar) gas was introduced into the vacuum deposition chamber 25.

(Vacuum Deposition Conditions)
 Degree of vacuum: $7.2 \times 10^{-4}$ torr ($9.6 \times 10^{-2}$ Pa)
 Cooling drum temperature: 0° C.
 Rate of vacuum deposition: 7 nm/sec
 Metal-depositing surface: surface pretreated by corona discharge The above cooling drum means the coating drum 24. This applies to the following Examples.

(Production of Noncontact IC Tag)

A laminate of a transparent biaxially oriented PET film with a thickness of 38 μm and aluminum foil with a thickness of 25 μm, obtained by dry lamination, was used as the base film 11 of a noncontact IC tag. A photoresist was applied to this base film 11. The resist surface was covered with a photomask having antenna patterns 2 and was exposed to light. After conducting exposure development, the photoresist layer was photo-etched, thereby forming the antenna patterns 2 as shown in FIG. 1.

An IC chip 3 having a plane size of 1.0 mm square and a thickness of 150 μm was connected to both ends 2a, 2b of each antenna pattern 2 on the base film 11 by heat pressing, with the IC chip 3 facing down. There was thus obtained a complete base film 11. The external size of each antenna pattern 2 was about 45 mm×76 mm.

A transparent, biaxially oriented PET film having a thickness of 12 μm was laminated, with an adhesive 5a, to the base film 11 surface on which the IC tag circuits of noncontact IC tags 1 had been formed. To the other surface of the base film 11, the above-prepared backing sheet 6 with the deposited metal film was laminated with an adhesive 5b, with the deposited metal film 6m facing to the base film 11.

A transparent polyester adhesive was used as the adhesives 5a, 5b. Finally, release paper 8 was laminated, with a 12-μm thick pressure-sensitive adhesive layer 7, to the back surface of the backing sheet 6, and this laminate was cut into individual noncontact IC tags 1 with release paper, each IC tag in a size of 54 mm×86 mm.

Example 2

(Preparation of Substrate with Deposited Metal Film)

A 12-μm thick, biaxially oriented PET film whose surface had been subjected to corona discharge treatment was used as the surfacing sheet 4. This PET film was set on a feed roll in a PVD apparatus 20. While feeding the PET film, tin (Sn) was deposited, under the following conditions, on the PET film surface pretreated by corona discharge to form a 10-nm thick film 6m of islands-in-sea structure. In order to evacuate the vacuum deposition chamber 25 to the desired degree of vacuum, argon (Ar) gas was introduced into the vacuum deposition chamber 25.

(Vacuum Deposition Conditions)
 Degree of vacuum: $7.4 \times 10^{-4}$ torr ($9.9 \times 10^{-2}$ Pa)
 Cooling drum temperature: 0° C.
 Rate of vacuum deposition: 7 nm/sec
 Metal-depositing surface: surface pretreated by corona discharge (Production of Noncontact IC Tag)

A complete base film 11 was obtained by forming antenna patterns 2 and connecting an IC chip 3 to both ends of each antenna pattern 2 in the same manner as in Example 1.

The above-prepared surfacing sheet 4 with the deposited metal film was laminated, with an adhesive 5a, to the base film 11 surface on which the IC tag circuits of noncontact IC tags 1 had been formed, in such a fashion that the deposited metal film would be the outermost surface. On the other surface of the base film 11, a 20-μm thick PET film serving as the backing sheet 6 was laminated with an adhesive 5b.

A transparent polyester adhesive was used as the adhesives 5a, 5b. Finally, release paper 8 was laminated, with a 12-μm thick pressure-sensitive adhesive layer 7, to the back surface of the backing sheet 6, and this laminate was cut into individual noncontact IC tags 1 with release paper, each IC tag in a size of 54 mm×86 mm.

Example 3

(Preparation of Substrate with Deposited Metal Film)

A 20-μm thick, biaxially oriented PET film whose surface had been subjected to corona discharge treatment was used as the surfacing sheet 4. This PET film was set on a feed roll in a PVD apparatus 20. While feeding the PET film, tin (Sn) was deposited, under the following conditions, on the PET film surface pretreated by corona discharge to form a 10-nm thick film 6m of islands-in-sea structure.

(Vacuum Deposition Conditions)
 Degree of vacuum: $2.6 \times 10^{-4}$ torr ($3.5 \times 10^{-2}$ Pa)
 Cooling drum temperature: 0° C.
 Rate of vacuum deposition: 1 nm/sec
 Metal-depositing surface: surface pretreated by corona discharge (Production of Noncontact IC Tag)

On the surface of the above-prepared surfacing sheet 4 with the deposited metal film on the side opposite to the deposited metal film, a white-colored concealing layer was formed by gravure printing, using a titanium oxide pigment. In the same manner as in Example 2, this surfacing sheet 4 was laminated, with an adhesive 5a, to the surface of the base film 11 on which the noncontact IC tag circuits had been formed, in such a fashion that the deposited metal film 6m would be the outermost surface. Release paper 8 with a pressure-sensitive adhesive layer 7 was laminated in the same manner as in Example 2. The laminate obtained was cut into individual noncontact IC tags 1 with release paper, each IC tag in a size of 54 mm×86 mm.

Example 4

(Preparation of Substrate with Deposited Metal Film)

A 12-μm thick, biaxially oriented PET film whose surface had been subjected to corona discharge treatment was used as the surfacing sheet 4. This biaxially oriented PET film was set in a sputter deposition apparatus, and tin (Sn) was deposited, under the following conditions, on the PET film surface pretreated by corona discharge to form a 15-nm thick film 6m of islands-in-sea structure.

(Sputter Deposition Conditions)
 Degree of vacuum: $9.2 \times 10^{-4}$ torr ($1.2 \times 10^{-2}$ Pa)
 Cooling drum temperature: 4° C.
 Rate of deposition: 0.2 nm/sec
 Metal-depositing surface: surface pretreated by corona discharge (Production of Noncontact IC Tag)

In the same manner as in Example 2, the above-prepared surfacing sheet 4 with the deposited metal film was laminated, with an adhesive 5a, to the surface of the base film 11 on which the noncontact IC tag circuits had been formed, in such a fashion that the deposited metal film 6m would be the outermost surface. Release paper 8 with a pressure-sensitive adhesive layer 7 was laminated in the same manner as in Example 2. The laminate obtained was cut into individual noncontact IC tags 1 with release paper, each IC tag in a size of 54 mm×86 mm.

Example 5

(Preparation of Substrate with Deposited Metal Film)

A 12-μm thick, biaxially oriented PET film whose surface had been subjected to corona discharge treatment was used as the surfacing sheet 4. This PET film was set on a feed roll in a PVD apparatus 20. While feeding the PET film, tin (Sn) and aluminum (Al), evaporated from the respective sources, were deposited under the following conditions on the PET film surface pretreated by corona discharge to form a 20-nm thick Sn—Al alloy film 6m of islands-in-sea structure.

(Vacuum Deposition Conditions)

Degree of vacuum: $6.7 \times 10^{-4}$ torr ($8.9 \times 10^{-2}$ Pa)

Cooling drum temperature: 0° C.

Rate of vacuum deposition: 15 nm/sec

Metal-depositing surface: surface pretreated by corona discharge (Production of Noncontact IC Tag)

In the same manner as in Example 2, the above-prepared surfacing sheet 4 with the deposited metal film was laminated, with an adhesive 5a, to the side of the base film 11 on which the noncontact IC tag circuits had been formed, in such a fashion that the deposited metal film 6m would be the outermost surface. Release paper 8 with a pressure-sensitive adhesive layer 7 was laminated in the same manner as in Example 2. The laminate obtained was cut into individual noncontact IC tags 1 with release paper, each IC tag in a size of 54 mm×86 mm.

Example 6

(Preparation of Substrate with Deposited Metal Film)

A 12-μm thick, biaxially oriented PET film whose surface had been subjected to corona discharge treatment was used as the surfacing sheet 4. This PET film was set on a feed roll in a PVD apparatus 20. While feeding the PET film, tin (Sn) and aluminum (Al), evaporated from the respective sources, were deposited under the following conditions on the PET film surface pretreated by corona discharge to form a 10-nm thick Sn—Al alloy film 6m of islands-in-sea structure.

(Vacuum Deposition Conditions)

Degree of vacuum: $4.2 \times 10^{-4}$ torr ($5.6 \times 10^{-2}$ Pa)

Cooling drum temperature: 0° C.

Rate of vacuum deposition: 15 nm/sec

Metal-depositing surface: surface pretreated by corona discharge (Production of Noncontact IC Tag)

In the same manner as in Example 2, the above-prepared surfacing sheet 4 with the deposited metal film was laminated, with an adhesive 5a, to the surface of the base film 11 on which the noncontact IC tag circuits had been formed, in such a fashion that the deposited metal film 6m would be the outermost surface. Release paper 8 with a pressure-sensitive adhesive layer 7 was laminated in the same manner as in Example 2. The laminate obtained was cut into individual noncontact IC tags 1 with release paper, each IC tag in a size of 54 mm×86 mm.

Example 7

(Preparation of Substrate with Deposited Metal Film)

A 38-μm thick, transparent, biaxially oriented PET film on which antenna patterns 2 had been formed in the same manner as in Example 1 was used as the base film 11. This base film 11 was set on a feed roll in a PVD apparatus 20. While feeding the base film 11, tin (Sn) was deposited, under the following conditions, on the base film 11 surface bearing no antenna patterns 2, pretreated by corona discharge, to form a 10-nm thick metal film 6m of islands-in-sea structure.

(Vacuum Deposition Conditions)

Degree of vacuum: $7.4 \times 10^{-4}$ torr ($9.9 \times 10^{-2}$ Pa)

Cooling drum temperature: 0° C.

Rate of vacuum deposition: 7 nm/sec

Metal-depositing surface: surface pretreated by corona discharge (Production of Noncontact IC Tag)

To both end 2a, 2b of each antenna coil on the base film 11, an IC chip 3 having a plane size of 1.0 mm square and a thickness of 150 μm was connected by hot pressing, with the IC chip 3 facing down, thereby obtaining a complete base film. The external size of each antenna pattern 2 was approximately 45 mm×76 mm.

A 12-μm thick, transparent, biaxially oriented PET film serving as the surfacing sheet 4 was laminated, with an adhesive 5a, to the surface of the base film 11 on which the noncontact IC tag circuits of noncontact IC tags 1 had been formed. To the other surface of the base film 11, a 20-μm thick PET film serving as the backing sheet 6 was laminated, with an adhesive 5b. A transparent polyester adhesive was used as the adhesives 5a, 5b. Finally, release paper 8 was laminated to the back surface of the backing sheet 6 with a 12-μm thick, pressure-sensitive adhesive layer 7. The laminate obtained was cut into individual noncontact IC tags 1 with release paper, each IC tag in a size of 54 mm×86 mm.

Example 8

(Preparation of Substrate with Deposited Metal Film)

One-side coated paper, coated with an aqueous polyurethane resin "MET-W-165C" manufactured by Dainippon Ink & Chemical, Inc., Japan (64 g/m$^2$), was used as the surfacing sheet 4. This paper, the surfacing sheet 4, was set on a feed roll in a PVD apparatus 20. While feeding the paper, tin (Sn) was deposited, under the following conditions, on the coated surface of the paper to form a 10-nm thick film 6m of islands-in-sea structure.

(Vacuum Deposition Conditions)

Degree of vacuum: $7.4 \times 10^{-4}$ torr ($9.9 \times 10^{-2}$ Pa)

Cooling drum temperature: 0° C.

Rate of vacuum deposition: 7 nm/sec

Metal-depositing surface: coated surface (Production of Noncontact IC Tag)

In the same manner as in Example 2, the above-prepared surfacing sheet 4 with the deposited metal film was laminated, with an adhesive 5a, to the surface of the base film 11 surface on which the noncontact IC tag circuits had been formed, in such a fashion that the deposited metal film 6m would be the outermost surface. Release paper 8 with a pressure-sensitive adhesive layer 7 was laminated in the same manner as in Example 2. The laminate obtained was cut into individual noncontact IC tags 1 with release paper, each IC tag in a size of 54 mm×86 mm.

Comparative Example 1

(Preparation of Substrate with Deposited Metal Film)

A 12-μm thick, biaxially oriented PET film whose surface had been subjected to corona discharge treatment was used as the surfacing sheet 4. This PET film was set on a feed roll in a PVD apparatus 20. While feeding the PET film, aluminum (Al) was deposited, under the following conditions, on the surface of the PET film pretreated by corona discharge to form a 40-nm thick, conventional continuous deposited film of aluminum (Al).

(Vacuum Deposition Conditions)

Degree of vacuum: $3.7\times10^{-4}$ torr ($4.9\times10^{-2}$ Pa)

Cooling drum temperature: 0° C.

Rate of vacuum deposition: 25 nm/sec

Metal-depositing surface: surface pretreated by corona discharge (Production of Noncontact IC Tag)

In the same manner as in Example 2, the above-prepared surfacing sheet 4 with the deposited metal film was laminated, with an adhesive 5a, to the surface of the base film 11 on which the noncontact IC tag circuits had been formed, in such a fashion that the deposited metal film 6m would be the outermost surface. Release paper 8 with a pressure-sensitive adhesive layer 7 was laminated in the same manner as in Example 2. The laminate obtained was cut into individual noncontact IC tags 1 with release paper, each IC tag in a size of 54 mm×86 mm.

Comparative Example 2

(Preparation of Substrate with Deposited Metal Film)

A 12-μm thick, biaxially oriented PET film whose surface had been subjected to corona discharge treatment was used as the surfacing sheet 4. This PET film was set on a feed roll in a PVD apparatus 20. While feeding the PET film, tin (Sn) was deposited, under the following conditions, on the surface of the PET film pretreated by corona discharge to form a 20-nm thick, conventional continuous deposited film of tin (Sn).

(Vacuum Deposition Conditions)

Degree of vacuum: $6.7\times10^{-4}$ torr ($8.9\times10^{-2}$ Pa)

Cooling drum temperature: 0° C.

Rate of vacuum deposition: 30 nm/sec

Metal-depositing surface: surface pretreated by corona discharge (Production of Noncontact IC Tag)

In the same manner as in Example 2, the above-prepared surfacing sheet 4 with the deposited metal film was laminated, with an adhesive 5a, to the surface of the base film 11 on which the noncontact IC tag circuits had been formed, in such a fashion that the deposited metal film 6m would be the outermost surface. Release paper 8 with a pressure-sensitive adhesive layer 7 was laminated in the same manner as in Example 2. The laminate obtained was cut into individual noncontact IC tags 1 with release paper, each IC tag in a size of 54 mm×86 mm.

The above-described Examples 1 to 8 and Comparative Examples 1 and 2 are summarized in the following Table 1.

TABLE 1

| | Substrate | Deposited Metal | Film Thickness nm | Degree of vacuum × $10^{-2}$ Pa | Rate of deposition nm/sec | Use of substrate |
|---|---|---|---|---|---|---|
| Example 1 | PET20 μm | Sn | 20 | 9.6 | 7 | backing sheet 6 |
| Example 2 | PET12 μm | Sn | 10 | 9.9 | 7 | surfacing sheet 4 |
| Example 3 | PET20 μm | Sn | 10 | 3.5 | 1 | surfacing sheet 4 |
| Example 4 | PET12 μm | Sn | 15 | 12.0 | 0.2 | surfacing sheet 4 |
| Example 5 | PET12 μm | Sn, Al | 20 | 8.9 | 15 | surfacing sheet 4 |
| Example 6 | PET12 μm | Sn, Al | 10 | 5.6 | 15 | surfacing sheet 4 |
| Example 7 | PET38 μm | Sn | 10 | 9.9 | 7 | base film 11 |
| Example 8 | one-sided coat paper | Sn | 10 | 9.9 | 7 | surfacing sheet 4 |
| Comparative Example 1 | PET12 μm | Al | 40 | 4.9 | 25 | surfacing sheet 4 |
| Comparative Example 2 | PET12 μm | Sn | 20 | 8.9 | 30 | surfacing sheet 4 |

The deposited metal films in Examples 1 to 8 were confirmed to be of islands-in-sea structure. The size (mean diameter) of the islands, the distance (mean distance) between the islands, and the surface roughness of the deposited metal films were determined from the AFM images of the deposited metal films, obtained by the use of an atomic force microscope "Nano Scope III" manufactured by Digital Instruments Corporation. The results are shown in Table 2.

The deposited metal films 6m obtained in Examples 1 to 8 and in Comparative Example 1 and 2 were subjected to surface resistivity (Ω/□) measurement using a resistivity meter "MCP-HT260" manufactured by Mitsubishi Chemical Corp., Japan. Furthermore, the finally obtained noncontact IC tags of Examples 1 to 8 and those of Comparative Example 1 and 2 were subjected to a writing/reading test using an IC tag reader/writer "RCT-200-01" manufactured by Well Cat Corporation, operating at 13.56 MHz. This test was carried out by holding each IC tag over the IC tag reader/writer, with the two 5 cm apart, in such a manner that the antenna pattern 2 was positioned between the deposited metal film and the IC tag reader/writer. The results of the above measurement and test are also shown in Table 2.

TABLE 2

|  | Size of islands (nm) | Distance between islands (nm) | Surface resistivity ($\Omega/\square$) | Surface roughness (nm) | Communication performance of IC tag |
|---|---|---|---|---|---|
| Example 1 | 1050 | 80 | $4.3 \times 10^{18}$ | 52 | excellent |
| Example 2 | 850 | 120 | $6.9 \times 10^{20}$ | 36 | excellent |
| Example 3 | 780 | 170 | $1.2 \times 10^{18}$ | 14 | excellent |
| Example 4 | 780 | 50 | $7.2 \times 10^{12}$ | 29 | excellent |
| Example 5 | 1500 | 20 | $2.2 \times 10^{10}$ | 42 | excellent |
| Example 6 | 1500 | 50 | $5.4 \times 10^{14}$ | 23 | excellent |
| Example 7 | 850 | 120 | $6.9 \times 10^{20}$ | 78 | excellent |
| Example 8 | 850 | 120 | $6.9 \times 10^{20}$ | 92 | excellent |
| Comparative Example 1 | continuous film | continuous film | $9.7 \times 10^{-2}$ | 2 | caused failure |
| Comparative Example 2 | continuous film | continuous film | $0.8 \times 10^{0}$ | 113 | caused failure |

The noncontact IC tags of Examples 1 to 8 were found excellent in communication performance, but those of Comparative Examples 1 and 2 caused communication failure. Further, the deposited metal films in Examples 1 to 8 had surface roughness in the range of 10 to 100 nm.

The reason why the surface resistivity of the deposited metal film in Example 4 is lower than that of the deposited metal film in Example 3 is considered to be as follows: the former deposited metal film is thicker than the latter one, the rate of deposition of the former metal film is lower than that of the latter one, and the metal density of the former deposited metal film is higher than that of the latter one. The reason why the surface resistivity of the deposited metal film in Example 5 is lower than that of the deposited metal film in Example 1 is considered to be as follows: the deposited metal film in Example 5 has decreased electrical resistance because of aluminum (Al) co-deposited in Example 5.

In Examples 5 and 6, multi-source vapor deposition of tin (Sn) and aluminum (Al) was performed. The Sn—Al alloy films deposited on the substrates were analyzed by an ESCA "LAB220i-XL" manufactured by VG Scientific Corporation, England. The analysis showed that the ratio of the number of Sn atoms to that of Al atoms was in the range of 100:(1-10) in both Sn—Al alloy films.

The invention claimed is:

1. A noncontact IC tag with a non-conductive metal film, comprising:
   a base film,
   an IC tag circuit composed of an IC chip and an antenna pattern connected to the IC chip, formed on the base film, and
   a non-conductive deposited metal film present on at least one of the two sides of the base film,
   wherein a first plastic film or paper is laid on the base film on the side of the IC tag circuit, and
   a second plastic film or paper is further laid over the first plastic film or paper,
   the non-conductive deposited metal film being on the second plastic film or paper.

2. The noncontact IC tag with a non-conductive metal film according to claim 1, wherein an adhesive layer is formed on the base film on the side opposite to the IC tag circuit.

3. The noncontact IC tag with a non-conductive metal film according to claim 1, wherein the non-conductive deposited metal film is of islands-in-sea structure,
   the size of the islands being in the range of 20 nm to 1 μm,
   the distance between the islands being in the range of 10 to 500 nm.

4. The noncontact IC tag with a non-conductive metal film according to claim 1, wherein the non-conductive deposited metal film is a non-conductive, lustrous metal film,
   the IC tag circuit being non-observable from the outside of the non-conductive, lustrous metal film.

5. A noncontact IC tag with a non-conductive metal film, comprising:
   a base film,
   an IC tag circuit composed of an IC chip and an antenna pattern connected to the IC chip, formed on the base film, and
   a non-conductive deposited metal film present on at least one of the two sides of the base film,
   wherein the surface roughness of the non-conductive deposited metal film, determined by atomic force microscopy, is more than 10 nm and 100 nm or less as indicated by the center line average height Ra.

6. The noncontact IC tag with a non-conductive metal film according to claim 5, wherein the non-conductive deposited metal film is of islands-in-sea structure,
   the size of the islands being in the range of 20 nm to 1 μm,
   the distance between the islands being in the range of 10 to 500 nm.

7. A noncontact IC tag with a non-conductive metal film, comprising:
   a base film,
   an IC tag circuit composed of an IC chip and an antenna pattern connected to the IC chip, formed on the base film, and
   a non-conductive deposited metal film present on at least one of the two sides of the base film,
   wherein at least one of the two surfaces of the base film is covered with a plastic film or paper, the non-conductive deposited metal film being on the plastic film or paper, and wherein the non-conductive deposited metal film is a non-conductive, lustrous metal film, the surface roughness of the non-conductive, lustrous metal film, determined by atomic force microscopy, being more than 10 nm and 100 nm or less as indicated by the center line average height Ra.

8. The noncontact IC tag with a non-conductive metal film according to claim 7, wherein the non-conductive deposited metal film is of islands-in-sea structure, the size of the islands being in the range of 20 nm to 1 μm, the distance between the islands being in the range of 10 to 500 nm.

9. A noncontact IC tag with a non-conductive metal film, comprising:

a base film, an IC tag circuit composed of an IC chip and an antenna pattern connected to the IC chip, formed on the base film, and a non-conductive deposited metal film present on at least one of the two sides of the base film, wherein the non-conductive deposited metal film is a non-conductive, lustrous metal film, the non-conductive, lustrous metal film being formed on at least one of the two surfaces of the base film, the IC tag circuit being non-observable from the outside of the non-conductive, lustrous metal film.

10. The noncontact IC tag with a non-conductive metal film according to claim 9, wherein the non-conductive deposited metal film is of islands-in-sea structure, the size of the islands being in the range of 20 nm to 1 μm, the distance between the islands being in the range of 10 to 500 nm.

11. A noncontact IC tag with a non-conductive metal film, comprising:

a base film, an IC tag circuit composed of an IC chip and an antenna pattern connected to the IC chip, formed on the base film, and a non-conductive deposited metal film present on at least one of the two sides of the base film, wherein the non-conductive deposited metal film is a non-conductive, lustrous metal film, and a plastic film or paper is laid on the base film on the side of the IC tag circuit, the non-conductive, lustrous metal film being on the outer surface of the plastic film or paper, a concealing layer being formed on the inner surface of the plastic film or paper, the IC tag circuit being non-observable from the outside of the non-conductive, lustrous metal film.

12. The noncontact IC tag with a non-conductive metal film according to claim 11, wherein the non-conductive deposited metal film is of islands-in-sea structure, the size of the islands being in the range of 20 nm to 1 μm, the distance between the islands being in the range of 10 to 500 nm.

* * * * *

UNITED STATES PATENT AND TRADEMARK OFFICE
CERTIFICATE OF CORRECTION

| | |
|---|---|
| PATENT NO. | : 7,651,033 B2 |
| APPLICATION NO. | : 11/604195 |
| DATED | : January 26, 2010 |
| INVENTOR(S) | : Asakura et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 296 days.

Signed and Sealed this

Twenty-eighth Day of December, 2010

David J. Kappos
*Director of the United States Patent and Trademark Office*